Patented Jan. 27, 1931

1,790,448

UNITED STATES PATENT OFFICE

JOHN THOMAS, OF GRANGEMOUTH, SCOTLAND, ASSIGNOR TO SCOTTISH DYES, LIMITED, OF GRANGEMOUTH, SCOTLAND

PRODUCTION OF ANTHRAQUINONE SULPHONIC ACIDS

No Drawing. Original application filed June 19, 1924, Serial No. 721,118, and in Great Britain August 31, 1923. Divided and this application filed March 19, 1926. Serial No. 96,071.

This invention relates to the production of anthraquinone sulphonic acids and more specifically to the preparation of $\beta$-mono-sulphonic acids of anthraquinone. It is a divisional application from my application Serial No. 721,118 filed on the 19th day of June, 1924.

As the result of experiments I have discovered that very strong oleum, for example of about 65 per cent. strength, in the presence of a suitable catalyst can be used for closing the ring in the case of 2-benzoyl-benzoic acids without sulphonation taking place, leaving an excess of free sulphur trioxide after the re-forming is complete so that the solution on heating directly yields $\beta$-mono-sulphonic acid. As a result a convenient and cheap commercial process for the manufacture of this acid previously difficult to obtain is provided.

The invention consists in the treatment of 2-benzoyl-benzoic acid with oleum of about 65 per cent. strength in the presence of a suitable catalyst, followed by heating of the solution.

Example 1

40 parts of 2-benzoyl-benzoic acid are added to 60 parts of 65 per cent. oleum, to which had previously been added 0.4 part vanadium pentoxide. The temperature is then raised to 100° C. and then heated slowly up to 150° C. and kept at this temperature for 2 hours. The melt is then poured into 250 parts of water, boiled and filtered from the unchanged anthraquinone. The recovered anthraquinone is washed free from the sulphonic acids with boiling water. The filtrates are then treated with 18 parts of caustic soda. The mixture is boiled and allowed to stand. The sodium salt of the $\beta$-mono-sulphonic acid (anthraquinone-2-sulphonic acid) crystallizes out on cooling and is filtered and washed acid free. The anthraquinone disulphonic acid (mainly anthraquinone 2.6 and 2.7-disulphonic acids) in the filtrates can then be salted out or isolated in other ways.

If desired the recovered anthraquinone can be employed to replace its molecular equivalent of 2-benzoyl-benzoic acid in the production of the sulphonic acid carried out from a mixture of 2-benzoyl-benzoic acid and anthraquinone, the quantity of free sulphur trioxide being reduced in amount for sulphonating such mixtures.

Example 2

This is an example dealing with the preparation of "silver salt" (sodium salt of anthraquinone-$\beta$-sulphonic acid) utilizing anthraquinone recovered from a previous melt.

According to this example the charge is as follows:—

| | Parts by weight |
|---|---|
| Anthraquinone recovered from a previous melt | 140 |
| 2-benzoyl-benzoic acid | 243 |
| Oleum of 65 per cent. strength | 420 |
| Vanadium pentoxide | 0.4 |

The vanadium pentoxide is added to the oleum and the mixture of 2-benzoyl-benzoic acid and anthraquinone then slowly sprinkled in at such a rate as to prevent the temperature rising above 100° C. The charge is now slowly heated to 150° C. and maintained at this temperature for two hours. If the mixture is heated too quickly there is a tendency for the temperature to rise suddenly above 150° C. and the proportion of disulphonic acids formed tends to increase. The melt is boiled in 2,500 parts water, filtered hot and the residue is again boiled in 1,500 parts water, the unchanged anthraquinone filtered off, washed acid free and dried. 180 parts of caustic soda are added to the combined filtrates, which after stirring are allowed to stand for several hours. The "silver salt" is then filtered off and washed with 8 per cent. sodium chloride until acid free.

The filtrates are saturated with salt and the disulphonic acids (mainly anthraquinone 2.6 and 2.7-disulphonic acids) which separate out are filtered off, washed acid free with 25 per cent. brine and dried.

The yields obtained in the above sulphonation were 100 parts of recovered anthraquinone, 289 parts of "silver salt" and 119 parts of the sodium salts of anthraquinone disulphonic acids.

If sulphonation be carried out without vanadium pentoxide the time of sulphonation is considerably prolonged over that given above.

Having now described my invention what I claim as new and desire to secure by Letters Patent is:—

1. A method for the production of β-sulphonic acids of anthraquinone which consists in mixing together about 40 parts of 2-benzoyl-benzoic acid and about 60 parts of oleum of about 65% strength to which has previously been added about 0.4 parts of vanadium pentoxide, raising the temperature gradually to about 150° C. and maintaining this temperature for about 2 hours, pouring the melt into about 250 parts of water, boiling and filtering from the unchanged anthraquinone, treating the filtrate with about 18 parts of caustic soda, boiling and then separating the filtrate from the crystallized product.

2. A method for the formation of β-monosulphonic acids of anthraquinone which consists in mixing together about 40 parts of 2-benzoyl-benzoic acid and about 60 parts of oleum of about 65% strength to which has previously been added about 0.4 parts of vanadium pentoxide, raising the temperature gradually to about 150° C. and maintaining this temperature for about 2 hours.

3. A process for the production of β-monosulphonic acids of anthraquinone which consists in mixing together 2-benzoyl-benzoic acid, and excess of oleum and vanadium pentoxide and heating the solution to about 150° C.

4. A process for the production of β-monosulphonic acids of anthraquinone which consists in mixing oleum and vanadium pentoxide, incorporating an excess of this mixture with 2-benzoyl-benzoic acid and heating the mass gradually to 150° C.

5. A process for the production of β-sulphonic acids of anthraquinone which comprises the treatment of 2-benzoyl-benzoic acid with oleum in the presence of vanadium pentoxide under the action of heat of about 150° C.

6. A process for the production of β-monosulphonic acids of anthraquinone which comprises the treatment under the action of heat of 150° C. of 2-benzoyl-benzoic acid with oleum in the presence of an amount of vanadium pentoxide equivalent to about 1 part of vanadium pentoxide for 100 parts of benzoyl benzoic acid.

7. A process for the production of beta-sulphonic acids of anthraquinone which consists in mixing one part of benzoyl-benzoic acid with oleum of from 20 to 70% strength containing about 100th of a part of vanadium pentoxide and in amount sufficient to contain about one part of free sulphur trioxide and heating the mixture to a temperature not exceeding about 150° C. for a time until the product is substantially soluble in water.

In testimony whereof I have signed my name to this specification.

JOHN THOMAS.